July 14, 1936. J. C. LAWRENCE 2,047,210

PROCESS FOR PRODUCING CONCENTRATED HYDROFLUORIC ACID

Filed July 18, 1934 2 Sheets-Sheet 1

INVENTOR.
James C. Lawrence
BY
Richard L. Johnston
ATTORNEY.

INVENTOR.
James C. Lawrence
BY
Richard L. Johnston
ATTORNEY.

Patented July 14, 1936

2,047,210

UNITED STATES PATENT OFFICE 2,047,210

PROCESS FOR PRODUCING CONCENTRATED HYDROFLUORIC ACID

James C. Lawrence, Moylan, Pa., assignor to E. I. du Pont de Nemours & Company, Wilmington, Del., a corporation of Delaware Application July 18, 1934, Serial No. 735,873

10 Claims. (Cl. 23—153)

This invention relates to hydrofluoric acid, more particularly concentrated hydrofluoric acid, and a process for the production thereof.

It is known that hydrofluoric acid may be produced by the reaction of sulfuric acid with a mineral fluoride. According to previous processes, however, considerable difficulty has been experienced in the production of concentrated hydrofluoric acid because of the trouble encountered in removing water vapor from the product. While it has previously been proposed to remove water from the hydrofluoric acid vapors by passing them through dehydrating materials such as concentrated sulfuric acid, oleum or sulfates of the alkaline earth metals, such processes are usually impractical or inoperable on account of side reactions (e. g., concentrated sulfuric acid reacted with hydrogen fluoride to form fluosulfonic acid) or relatively unsatisfactory because of the added expense and also on account of the additional difficulties and dangers involved in the handling of the hydrofluoric acid and dehydrating agents, such as oleum.

Prior processes for the manufacture of hydrofluoric acid also have been attended by the disadvantage of operation as a batch process rather than a continuous process. Thus, according to one type of process used for the manufacture of hydrofluoric acid, a pot still is filled with fluorspar, which is then mixed with sulfuric acid, and heat applied. The hydrofluoric acid gas which is evolved is recovered in a suitable absorber or condenser, and at the conclusion of the operation it is necessary to disassemble the reaction vessel and remove the hard, solid residue preparatory to the introduction of a fresh charge. Obviously, a process and apparatus of this character necessarily have a limited output or capacity and leave much to be desired from an economic standpoint. Furthermore, this method of producing hydrofluoric acid yields directly only a relatively dilute acid rather than a highly concentrated acid.

It is an object of the present invention to provide a new and improved process for the production of concentrated hydrofluoric acid. Another object is the provision of a continuous process for the production of hydrofluoric acid by a procedure which enables the recovery of both relatively dilute hydrofluoric acid and highly concentrated hydrofluoric acid from the same operation. A still further object is the provision of a method for producing hydrofluoric acid from an acid and a fluoride by an improvement which enables the amount of water present in the evolved reaction vapors to be substantially reduced. An additional object is the provision of a process involving a series of steps which lead to the production of concentrated hydrofluoric acid in high yields and in a high state of purity. Other objects will appear hereinafter.

These objects are accomplished according to the present invention by the provision of a process and apparatus adapted to the continuous production of concentrated and relatively dilute hydrofluoric acid and characterized by: (1) the formation of hydrofluoric acid by the reaction of a fluoride and an acid under super-atmospheric pressure; (2) continuously introducing the reactants into the reaction zone and continuously withdrawing the reaction products while maintaining super-atmospheric pressure; (3) subjecting the evolved vapors containing hydrofluoric acid to a preliminary condensation at suitable temperatures to effect the separation of relatively dilute hydrofluoric acid; and (4) condensing the residual gas or vapor. The final condensate is a concentrated hydrofluoric acid suitable for use in a wide variety of chemical operations. The condensate obtained in step 3 is a less concentrated hydrofluoric acid which may be used as such or further concentrated in any suitable manner, preferably by vaporization in a fractionating column and subsequent condensation of the vapors.

The apparatus falling within the invention is subject to considerable variation and modification in the manner of its practical construction but may be illustrated by the forms of apparatus in the accompanying drawings, in which similar numbers refer to similar parts throughout the several views and description thereof.

Figure 1:
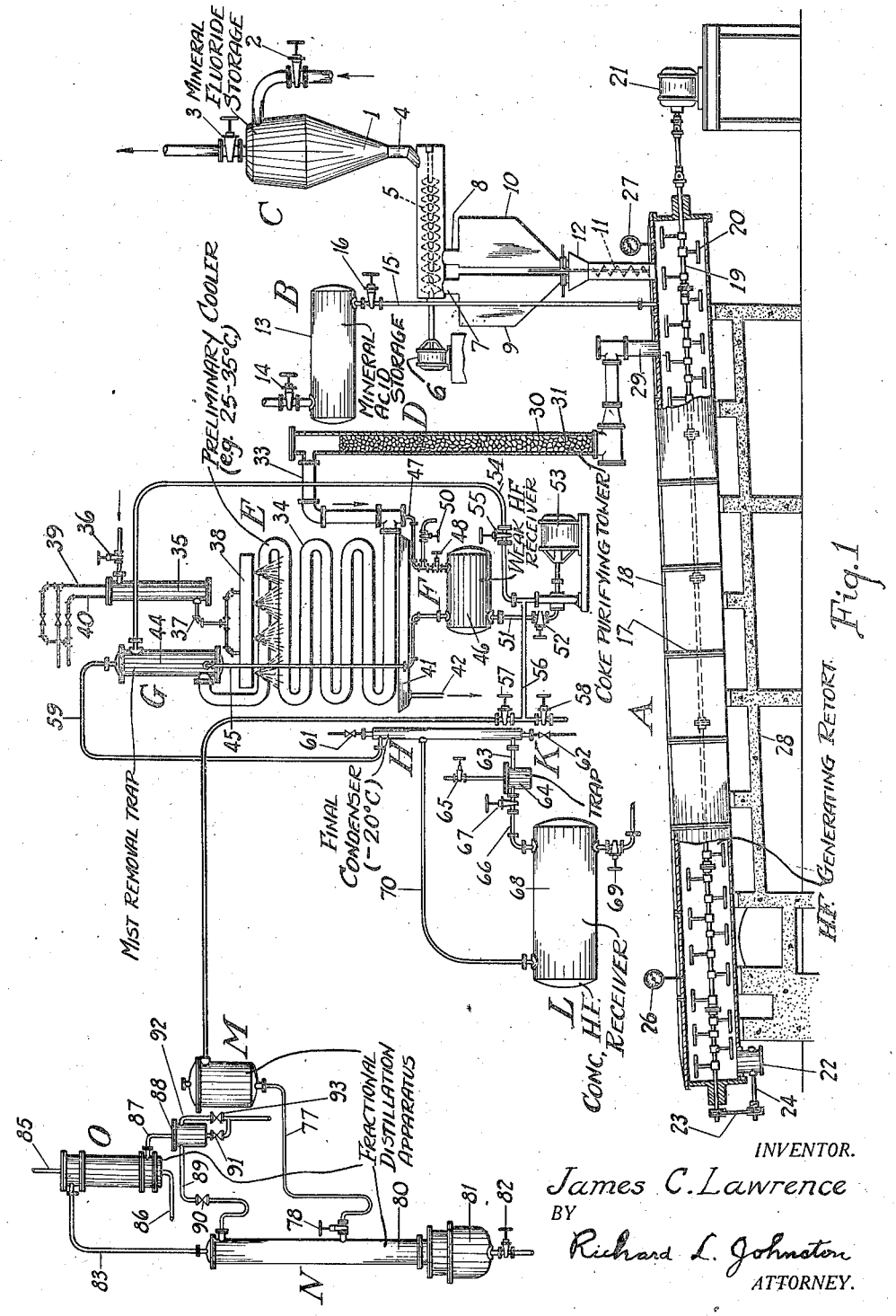
Fig. 1 is a side view, partly in section and somewhat diagrammatic, of one form of apparatus for carrying out the process of the invention.

Referring to Fig. 1 of the drawings, the apparatus illustrated comprises generally a reactor A and a means of introducing the reactants, namely an acid and a fluoride, into the reactor A from a suitable storage container for the reacting acid, generally illustrated at B, and a container for the fluoride, generally illustrated at C. The gases containing hydrofluoric acid evolved by the reaction are passed through a purifying means, such as illustrated at D, in order to remove dust and acids other than hydrofluoric acid which may be present. The resultant vapors are then subjected to a preliminary cooling or fractional condensation in a suitable manner, for example, by means of a fractional condenser such as generally illustrated at E, the condensate being collected by a convenient method as illustrated, for instance, by the storage container indicated at F. A vessel G is provided for the removal of mist. The gases or vapors remaining after this preliminary condensation are then introduced into a final condenser, such as illustrated at H. The condensate from H, together with any uncondensed gases, is passed through a suitable means for separating the uncondensed gases, such as shown at K, and the resultant concentrated hydrofluoric acid is collected in a suitable storage vessel generally indicated at L. The concentration of this acid may vary somewhat depending largely upon the raw materials and the operating conditions but under the preferred conditions of operation is usually 95 to 99%.

The less concentrated hydrofluoric acid contained in the storage vessel F may be used as such for various purposes, or it may be introduced into the distillation column N by way of storage vessel M and subjected to a fractional distillation treatment whereby anhydrous hydrofluoric acid is obtained by the condensation of the vapors in the condenser O, and a constant boiling mixture of the acid remains as a residue in still-pot 81.

The detailed operation of the process of the invention may be conveniently illustrated with reference to specific reactants, sulfuric acid and fluorspar. Finely ground fluorspar is introduced into the storage equipment indicated at C, which comprises a container 1 provided with a valved inlet 2 for the finely ground fluorspar and a valved vent 3. From container 1 the fluorspar passes through a bottom outlet 4 into an enclosed screw conveyor 5 operated by a suitable means, such as, for example, a motor 6. From the screw conveyor 5 the fluorspar is introduced by way of lines 7 and 8 into suitable receivers or hoppers 9 and 10, respectively, which connect through an enclosed funnel 12 with a vertical screw conveyor 11 which may be operated by a motor of suitable design (not shown). The screw conveyor 11 discharges the fluorspar against a positive or super-atmospheric pressure into one end of the retort indicated at A. Sulfuric acid is introduced into the retort A through a line 15 and valve 16 leading from a sulfuric acid storage, generally indicated at B and comprising a container 13 provided with a valved sulfuric acid inlet 14.

As an alternative method of operation, the vertical screw conveyor 11 may discharge fluorspar against a positive or super-atmospheric pressure into a pre-mixing mill along with the sulfuric acid through line 15 and valve 16 from a sulfuric acid storage. This pre-mixing mill will then deliver the mixed fluorspar and sulfuric acid in the form of a paste into the end of the retort A. In this manner, the retort may be shortened as the mixing is done externally and not in the first section of the heated retort.

The reactor indicated at A, as shown, comprises a U-shaped retort 17 which is closed for operating under positive or super-atmospheric pressure by means of a cover 18. Within the retort 17 is a device for agitating the reaction mixture consisting of radial arms 20 operating on a central drive shaft 19 which, in turn, is operated by a suitable means such as, for example, a motor illustrated at 21. The retort is inclined in order to facilitate the continuous passage of the reaction mixture away from the zone of introduction of the reactants. A heating means, such as indicated by the furnace at 28, is provided to maintain the desired temperature in the retort. In operating the process, it has generally been found desirable to increase the temperature of the reaction mixture as it is forced away from the zone of introduction of the reactants. The non-gaseous reaction products which, in case a mineral fluorspar is used initially, comprise substantially calcium sulfate are removed from the reaction zone by a special continuous discharge device shown at 22, which is capable of effecting the discharge while maintaining super-atmospheric pressure in the reaction zone. This device is operated by shaft 24 which is synchronized with the central drive shaft 19 in any suitable manner, for example, by means of an arrangement of pulleys and a belt, such as indicated at 23. The pressure in the retort is indicated by pressure gauges 26 and 27.

The gaseous reaction products which may be removed from the retort at any convenient place are preferably withdrawn near the zone of introduction of the reactants through line 29 which connects with the purifier indicated at D. The purifier D consists of a container 30 which is filled with a suitable purifying medium such as, for example, coke, indicated at 31 which serves to remove the dust and most of the sulfuric acid mist present in the gas. After passage through the coke, the remaining gases, comprising substantially hydrofluoric acid and water, pass through a line 33 into the fractional condenser E. The fractional condenser E consists of a coil 34 of relatively large diameter which is cooled by water from a water cooler 35. Water cooler 35 is provided with suitable cooling coils containing a refrigerating medium such as, for example, refrigerated brine, which is introduced through a valved inlet 39 and withdrawn through a valved outlet 40. The water to be cooled is introduced into the water cooler 35 through a valved inlet 36 and the cooling water is withdrawn from cooler 35 through line 37 which connects with the spray device 38. The water from the spray 38 is collected in a suitable open vessel, such as illustrated at 41, having an outlet 42. Under some climatic conditions water cooler 35 may be omitted from the construction of the apparatus.

In operating the process, it is desirable that the temperature of the cooling medium for cooling fractional condenser E be such as to maintain the temperature of the coils 34 above but preferably not more than about 15° higher than the boiling point of hydrofluoric acid.

The condensate collected in coils 34 is withdrawn through a line 47 and introduced through valve 48 into storage tank 46. A valved sample line 50 on line 47 is provided to remove test samples of the acid obtained. In using the specific reactants described, this acid is normally a relatively dilute hydrofluoric acid varying in concentration from about 60% to about 80%. It will be recognized, however, that the concentration of the acid may vary widely depending largely upon the character of the starting materials and the temperature used in fractional condenser E. As previously indicated, this acid may be used as such or it may be passed through line 51 and valve 52 to a pump 53 by means of which it may be forced through line 56 controlled by valve 57 into a storage tank generally indicated at M. From this storage tank it may then be introduced through line 77 and valve 78 into the column generally indicated at N and further treated as hereinafter described. Where it is desired to use the relatively dilute hydrofluoric acid as such, it may be withdrawn through a valved outlet 58. A portion of the relatively dilute hydrofluoric acid collected in storage tank 46 may be circulated through line 51 and valve 52 and forced by a suitable means, such as, for example, pump 53, through line 54 and valve 55 into the upper part of the vessel indicated at G. This vessel consists of a container 44, preferably having on the inside thereof several plates (not shown) such as may be used in a distillation column. Any liquids condensed or introduced into this vessel fall to the bottom, are removed through line 45 or cooling coils 34 and are collected in storage tank 46.

The residual gases pass through line 59 to a condenser generally indicated at H. This condenser may be of any suitable design adapted to obtain relatively low temperatures. It may be cooled by direct expansion of a refrigerant such as, for example, carbon dioxide introduced through a valved inlet line 61 and withdrawn through a valved outlet line 62. The condensate is removed through line 63 and any uncondensed gases separated by a suitable means such as indicated at K. The separating means indicated at K consists of a trap 64 having a valved vent line 65 through which the uncondensed gases may be removed by venting to the atmosphere or in any other suitable manner, for example, by venting to a caustic bubbling tank.

The concentrated hydrofluoric acid passes through line 66 and valve 67 into the storage equipment generally indicated at L. The storage equipment L may conveniently comprise a container 68 having a valved bottom outlet 69 through which the concentrated hydrofluoric acid may be withdrawn for use as such. A line 70 connecting to the upper part of the container 68 and the upper part of the condenser indicated at H is provided to equalize the pressures in these portions of the apparatus.

For further concentration, the relatively dilute hydrofluoric acid contained in the container 46 may be forced by means of pump 53 through line 56 and valve 57 to the storage tank, generally indicated at M, from which it may be introduced into the column 80 through line 77 and valve 78. If desired, the relatively more concentrated hydrofluoric acid in storage vessel L may be similarly treated. Column 80, which is maintained at such a temperature that the hydrofluoric acid is vaporized, serves to remove practically all of the moisture which is present. A less concentrated acid collects in the still pot 81 and may be periodically removed through the valved bottom outlet 82. The vapors passing upward through line 83 are introduced into condenser O. Condenser O may be of a tubular, coiled or of any other suitable type and is maintained at a condensation temperature by means of a suitable cooling medium such as, for example, refrigerated brine introduced by way of line 85 and withdrawn through line 86.

Substantially anhydrous hydrofluoric acid is withdrawn from condenser O through line 87 into a trap 88. A portion of the acid collected in trap 88 is returned through line 89 and valve 90 to the column N where it serves as a refluxing liquid. The remainder of the acid may be withdrawn through line 92 and valve 93. The valved bottom outlet 91 to trap 88 is provided largely for the purpose of draining the trap.

Figure 2:
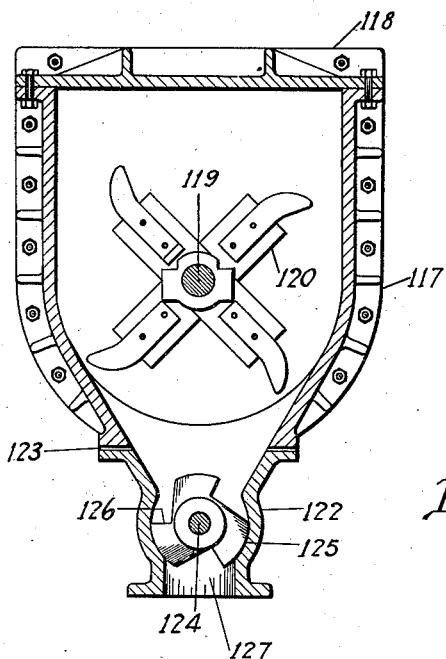
Fig. 2 is a profile or end view, partly in section, of a portion of the apparatus shown in Fig. 1.

The profile or end view of the retort A, shown partly in section in Fig. 2, illustrates in more detail the type of device which may be used in continuously removing the non-gaseous reaction products while maintaining super-atmospheric pressure. In Fig. 2, the portions of the apparatus shown are the U-shaped retort 117 closed at the top by means of the cover 118. Within the retort is shown a central drive shaft 119 and several of the T-shaped agitating devices 120, which are connected to and driven by the shaft 119. The device for removing the non-gaseous reaction products comprises a shell or case 122 which is fastened to the retort at the point 123. Within this shell 122 and closely fitting to the walls thereof is an eduction device 125, driven by a shaft 124 which, in turn, is synchronized with the central drive shaft 119. This eduction device 125, as shown, is so constructed that at no time in its operation is there a direct passage of air from the outside. Accordingly, by this type of device it is possible to maintain the super-atmospheric pressure inside of the retort. The pockets 126 in the eduction device 125 collect the non-gaseous residue as it is continuously forced through the retort and remove it through the opening 127. The speed of rotation of the eduction device 125 may be regulated according to the amount of non-gaseous residue to be removed.

Figure 3:
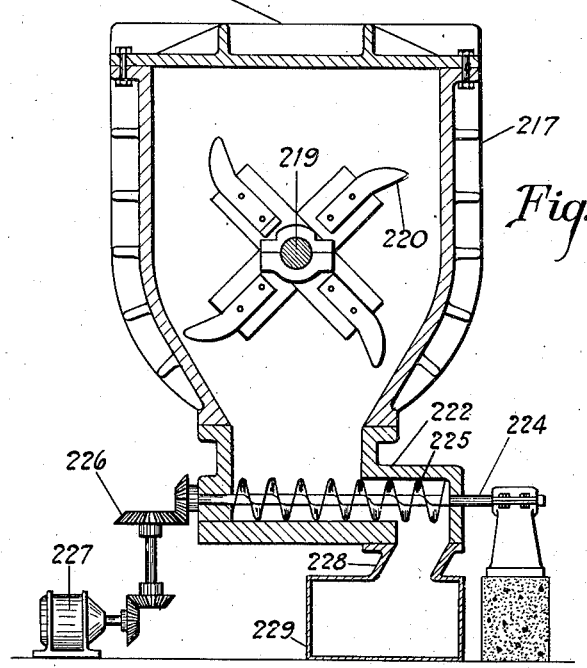
Fig. 3 is a view partly in section of a modified form of the portion of the apparatus shown in Fig. 2.

In Fig. 3, a modified method of removing the non-gaseous residue from the retort A is illustrated. The modified retort A is shown in profile, partly in section, comprising the outer casing of the retort 217, the top 218, the central drive shaft 219, and the agitating device, generally indicated at 220. The non-gaseous solid residue is removed from the retort by means of the worm-type conveyor 225 enclosed by a casing 222 and driven by a shaft 224 which connects through a series of gears generally illustrated at 226 with a suitable operating means, such as a motor 227. The residue is discharged through opening 228 into a closed container illustrated at 229. This type of eduction device is considered to be more efficient than that illustrated in Fig. 2, since the operation is such that little, if any, air may come into the retort through the opening 228, whereas in the device shown in Fig. 2 some air may be encompassed in the pockets 126 and carried into the retort. In either case, however, it is possible to maintain a super-atmospheric pressure as required in accordance with the operation of the process of the present invention.

In the construction of the various portions of the apparatus, any non-corrodible or substantially non-corrodible materials may be used. In practice, it has been found desirable to use iron, preferably steel, in constructing the retort A. The storage vessel for the acid B and the collector for the fluoride C may be made of any suitable materials, such as copper, iron or steel. The purifying tower D may likewise be constructed of copper, iron or steel. The coils 34 in which a relatively dilute hydrofluoric acid is present are preferably constructed of copper. The same is true of other portions of the apparatus exposed to the action of a relatively dilute hydrofluoric acid. The column G is preferably constructed of copper and the vapor line 59 leading out of the top of column G is also preferably constructed of copper. The condenser H in which concentrated hydrofluoric acid is condensed is preferably constructed of copper. The same is true of the separator for uncondensed gases K, but the storage vessel for concentrated hydrofluoric acid I is preferably made of steel. The portions of the distillation apparatus illustrated at M, N and O, and the various connecting lines should preferably be constructed of a material which is resistant to both relatively dilute and concentrated hydrofluoric acid such as, for example, copper. Iron materials of construction have given very satisfactory service in the construction of the fractionation apparatus. In general, in the practical construction of the apparatus it is preferable to use iron materials of construction, preferably steel, in all portions of the apparatus exposed to hydrofluoric acid having a concentration greater than about 70%. However, it has been found possible to employ iron materials of construction even where the hydrofluoric acid concentration is as low as 50%, as for example in still-pot 81. Some corrosion occurs but not enough to prevent commercially satisfactory results. It will be recognized that materials of construction may be varied widely in a manner well known to those skilled in the art.

Various changes may be made in the type of equipment and the arrangement thereof. Thus, various other methods may be used for forcing the reaction mixture through retort A. The purifying tower D may be omitted from the construction of the apparatus, in which case, however, the hydrofluoric acid would contain impurities such as fluoride, sulfuric acid or the like. Furthermore, various portions of the apparatus would be subjected to clogging on account of the dust carried out of the retort with the gaseous reaction products. Circulation of acid from storage vessel F to vessel G is not essential to operation of the process. The vessel G, together with lines 45 and 54, may be omitted from the construction of the apparatus. One of the purposes of using a plated column G is to remove or scrub out the mist from the gas stream issuing from the fractional condenser E. The cooling medium used in the various portions of the apparatus may vary widely according to the temperature desired.

The invention is further illustrated, but not limited, by the following example, in which the parts are by weight.

*Example*

In an apparatus similar in principle to that described in Fig. 1, fluorspar (containing about 98.5% calcium fluoride and 0.3% silica), ground to a fineness of about 300 mesh and carefully dried, was continuously fed into retort A from the fluorspar storage C against a pressure of about two to five pounds per square inch (gauge). Sulfuric acid having a concentration of about 98% was also continuously introduced into retort A from the storage vessel B. The proportions of fluorspar to sulfuric acid were so regulated that about 69 parts of fluorspar to 100 parts of sulfuric acid were used. The reaction

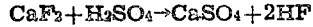
$CaF_2 + H_2SO_4 \rightarrow CaSO_4 + 2HF$ proceeded as the reactants were agitated and carried down the heated zone of the retort. The temperature of the retort A varied from about 150° C. at the zone of introduction of the reactants to about 315° C. in the lower end of the retort, the increased temperature toward the end of the retort being maintained by means of a suitably fired furnace. At the discharge end of the retort A the non-gaseous residue comprising substantially calcium sulfate was removed by means of a special eduction device, such as illustrated in Fig. 2, synchronized with the speed of the retort agitator shaft as described in connection with Fig. 1.

The gaseous reaction products comprising hydrofluoric acid vapors, the water vapor introduced into the retort by the sulfuric acid and fluorspar, and a small amount of sulfuric acid mist passed out of the retort A into the purifier D, which was packed in layers with coke of graduated size. Here, impurities such as dust and about 90% of the sulfuric acid mist were removed by the coke, leaving the hydrofluoric acid vapors and water with about 0.4% sulfuric acid mist or vapor to pass into the fractional condenser E at a temperature of about 150° C.

The concentration of the vapors entering the fractional condenser E was about 94.5% hydrofluoric acid, 5.1% water and 0.4% sulfuric acid. The fractional condenser E was cooled by a water spray, as shown in Fig. 1, so that the gases were cooled below about 35.6° C. but not lower than about 25.0° C. Sulfuric acid, water and hydrofluoric acid condensed out of the vapors at the temperatures given, the condensate flowing out of condenser E into the receiver F as a solution of hydrofluoric acid of approximately 75% strength. The cooled hydrofluoric acid gas containing only small proportions of water was then passed through column G into condenser H which was maintained at a temperature of about —20° C., and the condensate, concentrated hydrofluoric acid of a purity of about 99%, was collected in the receiver L after venting any uncondensed gases to the atmosphere in the separator K. The average yield of hydrofluoric acid was about 94%.

The less concentrated acid collected in the receiver F was further concentrated by introducing it into vessel M from which it was fed into the column N maintained at a temperature of about 19.5° C. at the top and about 110° C. at the bottom and in the still-pot 81. The vapors were condensed by means of condenser O and the condensate, anhydrous hydrofluoric acid, removed through trap 88. A relatively more dilute hydrofluoric acid, having a concentration of about 50% formed in the still-pot 81 and was withdrawn through the valved outlet 82.

The kind and amount of fluoride and acid to be reacted therewith employed in accordance with the invention may vary within relatively wide limits, depending largely upon the results desired. In order to produce a highly concentrated hydrofluoric acid (i. e., above about 90%), it is preferable to employ a fluoride relatively free from moisture and silica, and a relatively concentrated reacting acid so that the evolved crude gases containing hydrofluoric acid are also relatively free from moisture, preferably containing less than about 15% water. For this purpose, the fluoride employed should preferably contain little or no substances which form volatile impurities, as, for example, silicates, which form silicon tetrafluoride and fluosilicic acid, and carbonates. In practice, it has been found that especially desirable results are obtained in the use of a mineral fluoride such as fluorspar, i. e., a fluoride comprising substantially calcium fluoride. Fluorspar which has been treated to remove silica may advantageously be employed. As examples of other fluorides which may be reacted together with an acid under super-atmospheric pressure to produce hydrofluoric acid in accordance with the invention may be mentioned cryolite and the like.

In the formation of the hydrofluoric acid by the reaction of an acid with the fluoride, especially desirable results have been obtained in the use of concentrated sulfuric acid as the reacting acid, preferably having a concentration within the range of about 95% to 100% $H_2SO_4$. As further examples of acids forming hydrofluoric acid by reaction with a fluoride may be mentioned phosphoric acid and fluorsulfonic acid. Instead of the free acids, acid sulfates (e. g., sodium acid sulfate, potassium acid sulfate, and the like) may be used. It will be understood, however, that such acids, in general, neither possess the advantages of sulfuric acid nor produce comparable results.

The proportions of fluoride and acid may vary but, ordinarily, it is desirable to use at least the stoichiometrical proportions of acid required to convert the fluoride to hydrofluoric acid, and preferably an excess of acid. In practice, it has been found that in the reaction of fluorspar with concentrated sulfuric acid very good results are obtained in the use of about 5% excess sulfuric acid over the stoichiometrical proportions.

The temperatures maintained in the various steps of the process may vary within relatively wide limits. In the reaction zone the temperature should preferably be at least sufficient to drive off the hydrofluoric acid vapors. As a general rule, it is preferable to maintain the temperature in the reaction zone in excess of about 100° C. It has been found desirable to increase the temperature as the reaction proceeds, this being accomplished in any suitable manner, for example, by means of a furnace as described in connection with Fig. 1. Especially desirable results have been obtained in effecting the reaction initially at a temperature of about 140° C. to about 160° C. and gradually increasing the temperature to above 300° C., preferably about 310° C. to about 320° C.

The temperature of the purifier tower, such as illustrated by D in Fig. 1, should preferably be above the temperature of condensation of the hydrofluoric acid vapors in the crude gas from the reaction zone. In practice, it is customary to neither heat nor cool the tower D, although it may be heated or cooled if so desired.

As previously indicated, the temperature of the preliminary cooler or fractional condenser, such as illustrated by E in Fig. 1, should preferably be above the boiling point of hydrofluoric acid but not more than about 15° C. higher than the boiling point under the same conditions of pressure. Under conditions of operation where the crude gas comprises substantially hydrofluoric acid and about 5% to 15% water, this enables the recovery of a relatively dilute hydrofluoric acid suitable for many practical purposes. In general, the lower the temperature of the preliminary cooler E is maintained, the more concentrated is the hydrofluoric acid obtained in storage vessels F and L. It will be recognized that the rate of passage of the gases through the cooling equipment and the cooling capacity will largely determine the extent to which the gases are cooled.

The temperature of column G of Fig. 1, which may be considered as part of the recovery apparatus of fractional condenser E, is generally very nearly the same as that of the fractional condenser E, being heated or cooled ordinarily only by the gases and liquids introduced into it.

The temperature of the secondary condenser, such as illustrated at H in Fig. 1, should preferably be below about −20° C. but sufficiently high to preserve the condensate in liquid form. While higher condensation temperatures may be used in this step of the process, the recovery of hydrofluoric acid is more efficient at the temperatures indicated.

Where it is desired to further concentrate the hydrofluoric acid such as is recovered in storage vessel F of Fig. 1 by introduction into a fractional distillation apparatus, such as generally illustrated at N, the temperature of the column N should be sufficient to vaporize the hydrofluoric acid, being preferably about 19.5° C. to 20° C. at the top of the column and about 110° C. at the bottom. The condenser O may be maintained at any suitable condensation temperature, preferably about −20° C. or lower. In order to effect the vaporization, heat may be applied to the still-pot 81 or to the column N or to both by any suitable means, for example, by means of steam pipes (not shown).

The pressure in the various steps of the process is subject to considerable variation. If desired, all of the steps of the process may be operated under super-atmospheric pressure. It is especially desirable, however, from the standpoint of the present invention that the reaction involving the formation of the hydrofluoric acid be effected under super-atmospheric pressure. Even a slight super-atmospheric pressure improves the results over those obtained by operation at atmospheric or sub-atmospheric pressure. This improvement is manifested in the ability to obtain better efficiency and more concentrated hydrofluoric acid directly than are obtainable by operation under atmospheric or sub-atmospheric pressure.

The super-atmospheric pressure in the reaction zone may be maintained in any suitable manner, for example, by the introduction of an inert gas, e. g., nitrogen, under super-atmospheric pressure. If such inert gas is introduced, care should be taken that it is substantially free from moisture. In practice, it has been found that a super-atmospheric pressure in the reaction zone of an apparatus such as illustrated in Fig. 1 may be maintained by means of the back pressure created by the coke column in purifier tower D. In general, it is preferable to operate under this autogeneous super-atmospheric pressure. The autogenous super-atmospheric pressure in the reaction zone may vary widely, depending largely upon such factors as the size of the equipment, the proportions of reactants, the temperature, the method of introducing the reactants and the method of withdrawing the reaction products. Good results may be obtained where the super-atmospheric pressure corresponds to about 15 pounds per square inch or even less. If desired, much higher pressures may be used. The pressure should preferably be such that, under the temperatre conditions used, substantial condensation of the hydrofluoric acid does not occur in the reaction zone. Above the critical temperature of hydrofluoric acid, any super-atmospheric pressure may be used. As previously indicated, the pressure in the other portions of the apparatus may be the same as that in the reaction zone, or, if desired, lower or higher pressures may be used. Thus, according to the process described in connection with Fig. 1, the pressure in the portions of the apparatus following the purifier tower D may be gradually diminished until it is substantially atmospheric in condenser H.

The invention has the advantage that it provides a commercially practical and economical process and apparatus for the production of concentrated and relatively dilute hydrofluoric acid. Insofar as is known, highly concentrated hydrofluoric acid has not heretofore been produced commercially by a continuous process such as herein described. The use of super-atmospheric pressure in the reaction zone, as described in connection with Fig. 1, leads to the production of a more highly concentrated hydrofluoric acid directly and thereby increases the efficiency of operation.

By the terms "continuous" and "continuously", as used throughout the specification and claims with reference to the introduction of the reactants into the reaction zone and the withdrawal of the reaction products, it is intended to include the addition or withdrawal of these materials at intervals, as in a semi-continuous process, as well as their uninterrupted introduction and/or withdrawal.

As many apparently widely different embodiments of this invention may be made without departing from the spirit and scope thereof, it is to be understood that I do not limit myself to the specific embodiments thereof except as described in the following claims.

I claim:

1. In a process for producing concentrated hydrofluoric acid, the steps which comprise reacting together concentrated sulfuric acid and a mineral fluoride under continuously maintained super-atmospheric pressure, subjecting the evolved vapors to a preliminary cooling at a temperature not below the boiling point of hydrofluoric acid or more than about 15° above the boiling point of hydrofluoric acid under the pressure conditions used, removing the condensate, further cooling the residual vapors to a temperature below about −20° C., and recovering the resultant product.

2. In a process for the production of hydrofluoric acid having a concentration higher than 90%, the steps which comprise subjecting a substantially silica free fluorspar comprising substantially calcium fluoride to treatment with sulfuric acid under continuously maintained super-atmospheric pressure at a temperature above about 100° C., the amount of water present being such that the evolved gases contain less than about 15% water, subjecting the evolved vapors to a preliminary cooling at a temperature above but not more than about 15° higher than the boiling point of hydrofluoric acid under the pressure conditions used, removing the condensate, and condensing the residual vapors at a temperature below about −20° C.

3. A continuous process for producing concentrated hydrofluoric acid, which comprises continuously reacting concentrated sulfuric acid and a finely divided substantially silica-free mineral fluoride under continuously maintained super-atmospheric pressure, continuously withdrawing the evolved vapors from the reaction zone, continuously removing sulfuric acid from the evolved vapors without substantial condensation of the remaining gases, cooling the remaining gases to a temperature above but not more than about 15° higher than the boiling point of hydrofluoric acid, continuously removing the condensate, and further cooling the residual vapors to a temperature below about −20° C.

4. A continuous process for producing anhydrous hydrofluoric acid which comprises continuously introducing sulfuric acid having a concentration of about 98% and about equi-molecular proportions of a finely divided mineral fluoride comprising substantially calcium fluoride into one end of a longitudinal reaction zone, continuously withdrawing the evolved vapors near the zone of introduction of the reactants, continuously forcing the reaction mixture through the longitudinal zone of reaction away from the zone of introduction of the reactants, continuously withdrawing the solid residue comprising substantially calcium sulfate from the other end of the longitudinal reaction zone, while continuously maintaining super-atmospheric pressure in the reaction zone and a temperature in the reaction zone varying from about 140° C. to about 160° C. at the zone of introduction of the reactants to about 310° C. to about 320° C. at the zone of eduction of the solid residue, continuously removing sulfuric acid from the evolved vapors without substantial condensation of the remaining gases, cooling the remaining gases to a temperature above but not more than about 15° higher than the boiling point of hydrofluoric acid, continuously removing the condensate, further cooling the residual vapors to a temperature below about −20° C. but at a temperature sufficiently high to preserve the condensate in liquid form, and recovering the condensate.

5. In a process of producing highly concentrated hydrofluoric acid from gases containing chiefly hydrogen fluoride together with some water vapor and small amounts of mineral acids obtainable by the reaction of concentrated sulfuric acid and a mineral fluoride, the step which comprises subjecting said gases to a preliminary cooling at a temperature above but not more than about 15° higher than the boiling point of hydrofluoric acid under the pressure conditions used, removing the condensate, and condensing the residual gases at a temperature below about −20° C.

6. In a process of producing highly concentrated hydrofluoric acid, the step which comprises subjecting gases containing chiefly hydrogen fluoride together with not more than about 5% water vapor, obtainable by the reaction of concentrated sulfuric acid with a mineral fluoride, to a preliminary cooling at a temperature above but not more than about 15° higher than the boiling point of hydrofluoric acid under the pressure conditions used, removing the condensate, and condensing the residual gases at a temperature below about −20° C.

7. In a process of producing highly concentrated hydrofluoric acid, the step which comprises subjecting gases containing chiefly hydrogen fluoride together with less than 15% water vapor and small amounts of mineral acids, obtainable by the reaction of concentrated sulfuric acid with substantially silica-free calcium fluoride to a preliminary cooling at a temperature between about 25° C. and 35° C., removing the condensate, and condensing the residual gases at a temperature below about −20° C.

8. In a process of producing substantially pure, water-free hydrofluoric acid, the step which comprises subjecting a gaseous mixture containing approximately 94% hydrofluoric acid, approximately 5% water and a small amount of sulfuric acid, to a preliminary cooling at a temperature between about 25° C. and about 35° C., removing the condensate, and condensing the residual gases at a temperature below about −20° C.

9. In a process of producing highly concentrated hydrofluoric acid by the reaction of an acid with a fluoride followed by a preliminary cooling of the evolved vapors at a temperature above the boiling point of hydrofluoric acid to remove water vapor, then final condensation of the hydrogen fluoride, the step which comprises continuously maintaining super-atmospheric pressure in the zone of reaction between the said acid and the said fluoride.

10. In a process of producing highly concentrated hydrofluoric acid by the reaction of concentrated sulfuric acid with a substantially silica-free fluoride followed by a preliminary cooling of the evolved vapors at a temperature above the boiling point of hydrofluoric acid to remove water vapor, then final condensation of the hydrogen fluoride, the step which comprises continuously maintaining a super-atmospheric pressure in the zone of reaction between the said acid and the said fluoride.

JAMES C. LAWRENCE.